United States Patent
Rapaich (10) Patent No.: US 6,972,688 B2
(45) Date of Patent: Dec. 6, 2005

(54) POWER SUPPLY WITH MODULAR INTEGRATED NETWORKING

(75) Inventor: Mark Rapaich, Westfield, IA (US)

(73) Assignee: Gateway Inc., Irvine, CA (US)

( * ) Notice: Subject to any disclaimer, the term of this patent is extended or adjusted under 35 U.S.C. 154(b) by 126 days.

(21) Appl. No.: 10/762,046

(22) Filed: Jan. 21, 2004

(65) Prior Publication Data

US 2004/0157474 A1   Aug. 12, 2004

Related U.S. Application Data (60) Provisional application No. 60/443,078, filed on Jan. 28, 2003.

(51) Int. Cl.[7] .............................................. G08B 23/00

(52) U.S. Cl. ............................ 340/693.1; 340/310.01; 307/11

(58) Field of Search .......................... 340/693.1, 693.5, 340/310.01; 307/11, 43; 363/143

(56) References Cited

U.S. PATENT DOCUMENTS

| | | | | |
|---|---|---|---|---|
| 4,290,057 A | * | 9/1981 | Knight | 340/635 |
| 5,007,860 A | * | 4/1991 | Robinson et al. | 439/540.1 |
| 5,701,244 A | * | 12/1997 | Emmert et al. | 363/146 |
| 5,744,750 A | * | 4/1998 | Almond | 174/49 |
| 5,768,097 A | * | 6/1998 | Jelinger | 361/683 |
| 5,837,968 A | | 11/1998 | Rohrberg et al. | |
| 5,995,400 A | * | 11/1999 | Park et al. | 363/146 |
| 6,373,377 B1 | | 4/2002 | Sacca et al. | |
| 6,894,622 B2 | * | 5/2005 | Germagian et al. | 340/693.5 |

* cited by examiner

Primary Examiner—John Tweel, Jr.
(74) Attorney, Agent, or Firm—Frank Liebenow (57) ABSTRACT

A power supply that has an integrated power line networking coupling circuit and a connector to accept a removable power line networking module. The power supply and associated system can be sold without power line networking or with power line networking, and if sold without power line networking, it can be upgraded at a later time to support power line networking. Additionally, power line networking modules can be replaced in the field if failures occur or for upgrade purposes if a more robust networking standard becomes available.

25 Claims, 5 Drawing Sheets

POWER SUPPLY WITH MODULAR INTEGRATED NETWORKING

BACKGROUND OF THE INVENTION

This application is related to, and claims priority to U.S. provisional application Ser. No. 60/443,078, filed Jan. 28, 2003, entitled "APPARATUS AND METHODS OF NETWORKING DEVICES, SYSTEMS AND COMPUTERS VIA POWER LINES", the entirety of which is incorporated by reference herein, including all of the documents referenced therein. Additionally, this application is related to U.S. application Ser. No. 10/761,968 titled, "MODULATED DATA TRANSFER BETWEEN A SYSTEM AND ITS POWER SUPPLY," which was filed on even date herewith; and inventor Keith Thomas. Additionally, this application is related to U.S. application Ser. No. 10/761,994 titled, "HOME POWER LINE NETWORK CONNECTED PHONE," which was filed on even date herewith; and inventor Frank Liebenow.

FIELD OF THE INVENTION

The present invention generally relates to the field of power supplies where the power supply serves not only as a conduit for power coming into a system, but also serves as a conduit for network data to come in and out of a system. The present invention relates to a modular networking capability of a power supply.

BRIEF DESCRIPTION OF THE RELATED ART

There are several forms of networking available today. These include networking over dedicated wires such as IEEE Standard 802.3, wireless networking such as IEEE Standard 802.11 and, more recently, networking over existing wires, including phone lines (Home Phone Line Alliance) or power lines (HomePlug™ Power Line Alliance). Each form of networking has its advantages and disadvantages. For example, an advantage of wireless networking allows the user to roam anywhere within range of an Access Point and a disadvantage of such would be lower transmission throughput. Networking over power lines has recently become viable with technology promoted by the HomePlug™ Powerline Alliance. This technology is especially useful for systems that generally require an external power source when operating. For example, a desktop computer or a printer must be plugged into a standard power source such as 120V AC in order to operate. Even systems that have secondary power sources, such as notebook computers having rechargeable batteries, are predominately used while connected to an AC power source.

Current HomePlug™ Powerline Alliance network adaptors use a network interface module that resembles a "wall-wart" power supply. In this, the wall-wart device is plugged into the power source (e.g., 120V AC) and contains the entire power line network adapter which extracts networking signals from the power line and translates them into a standard interface protocol, such as Universal Serial Bus (USB) version 2.0, Firewire (IEEE 1394) or Ethernet. Likewise, interface packets coming from the USB interface are translated into power line networking signals and are modulated onto the power line. The USB interface is then connected to the system, possibly a computer system, a printer or another device that needs a network connection. This method of connecting a system to the power line works, but requires a separate component, e.g., the "wall-wart," a second cable, and instead of using one outlet for system power, requires a second outlet for the "wall-wart." Furthermore, it requires a data connection to the system through an external data connector such as a USB Port, Firewire Port or Ethernet Port. This reduces the number of free available external data connectors by one.

Being that systems are generally connected to AC power in order to receive operating power, it would be advantageous to integrate the power line networking into a system's power supply. In that, both can share isolation and protection systems, both can share an enclosure (if needed) and both can share one connection to the AC power source (e.g., 120 V AC). Existing power supplies have no capabilities for power line networking. One way to accomplished this would be by routing the raw AC power to another component outside of the power supply, yet within the system. This would have the adverse affect of exposing components outside of the power supply enclosure to the dangers associated with a direct connection to AC power. Alternately, this could be accomplished by including the complete networking adapter within the power supply. This solution would provide protection from the dangerous AC power, but has the problem of creating a power supply that always has the added cost of integrated power line networking. Such a solution may be useful if every system uses power line networking, but with all the alternate networking methods previously listed, there are situations where some customers want power line networking, some want wireless and some want dedicated, high-speed connections (e.g., Ethernet). If every power supply included power line networking, then those customers who did not use power line networking would be burdened by the increased cost and reliability issues associated with extra components integrated into their power supply. Manufacturers could offer some systems with the integrated power line networked power supply and some systems with a non-integrated power supply, but this would require careful forecasting and would require a complete power supply replacement should the customer later decide to convert to power line networking. A solution that exhibits these pitfalls is described in U.S. Pat. No. 6,373,377 to Sacca, et al., which describes an approach whereby a large portion of the network adapter is included in every power supply. This approach adds considerable electronics to the power supply, for example, an Analog Front End (AFE), Control Circuitry, Digital to Analog Converters, Analog to Digital Converters and a Digital Interface for connection to the main system.

A solution to the problem of integrating power line networking into every power supply would be to provide a module that could be inserted into the power supply or mounted on the outside surface of a power supply and that module would connect to the AC power source through the power supply and perform all power line network functions.

SUMMARY OF THE INVENTION

The present invention is directed to a power supply that has a receptacle for receiving a module, said module having a power line networking adapter. The module may fit into the power supply through an opening in the power supply's case or may attach to the surface of the power supply's case, held in place possibly by the friction of a connector or another fastening means. With this invention, power supplies can be manufactured with minimal added expense so that a manufacturer can produce systems where the same power supply is included in every model, yet the power line network module can be added after receiving a customer order or at any time the power line networking option is desired. Since the design can allow for isolation from dangerous AC power levels, the end-user can safely upgrade their system with minimal risk of shock. The power line network upgrade slot can be covered by a door to prevent insertion of metal objects into the power supply when the option isn't present. Since the module may be entirely contained in a power supply, proper coupling to the AC supply of the power supply may be accomplished. By providing the module within a power supply, the module does not need to be further isolated from the power line, provided that the digital output is isolated. With respect to power line networking, another advantage of this type of integration is that, with insertion of the module, the power supply becomes a standalone, self-contained device that handles communication with the power line. In this way, the power supply alone is subject to Federal Communications Commission (FCC) compliance. In another embodiment of the present invention, the power line networking module may be attached to the outside of the power supply and connected to possibly power and the AC line through a connector. In this embodiment, it may be necessary to encapsulate the power line networking module to reduce the risk of electrical shock and, possibly, to shield from undesired emissions. In this embodiment, the module may be held in place by the friction of the connector or may have additional fasteners, perhaps a hook at one end and a screw at the other.

Another advantage of the present invention is the ability to upgrade the power line network adapter without replacing the entire power supply. If the power line networking was integrated into the power supply and the user wanted to upgrade, perhaps to take advantage of a newer, faster power line networking interface standard, they would have to purchase a new power supply at a higher cost and increased shipping weight. Instead, with the present invention, the upgrade could be accomplished by removing the existing power line networking module and inserting a new power line networking module, perhaps a new module that has greater throughput. In another embodiment of this invention, all power line networking components may be located on the module, including the coupling circuits. In this embodiment, the power line input may be routed directly to the module through a connector.

It is to be understood that both the forgoing general description and the following detailed description are exemplary only and are not restrictive of the invention as claimed. The general functions of this invention may be combined in different ways to provide the same functionality while still remaining within the scope of this invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently discussed embodiment of the invention, an example of which is illustrated in the accompanying drawings.

Figure 5:
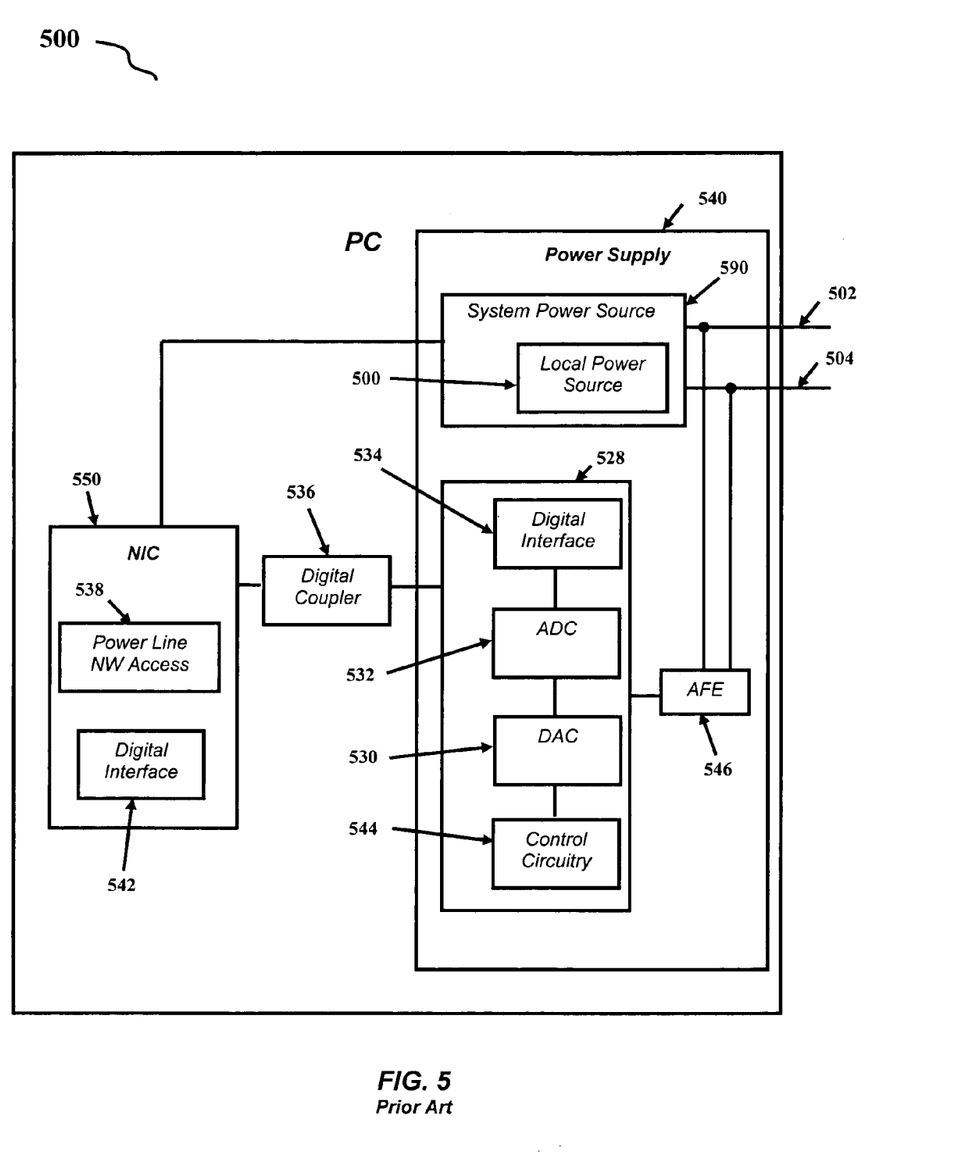
FIG. 5 shows a block diagram of a power supply as described in the prior art.

Referring now to FIG. 5, a computer system PC for power line networking as described in the prior art is shown (see U.S. Pat. No. 6,373,377). This patent may show how to integrate a substantial subsection of the power line networking adapter into the power supply, but it does not show how to design a modular power supply that can accept a power line networking module when desired.

Power line network access circuitry 538 is coupled through a digital interface 542 (serial, parallel or a combination thereof) to a power supply 540. The power line network access circuitry 538, which may be part of a Peripheral Component Interconnect (PCI) card, provides digital data through the digital interface 542 and receives digital data from the digital interface 542. The PCI card may be, for example, a network interface card (NIC) 550. Note that the present invention does not require a separate network interface card (NIC). Power line network access circuitry generally refers to circuitry for transmission or reception of data over a power line or circuitry for processing such data to or from a host controller. The digital interface 542 generally includes a transmitter to transmit digital data to the power supply 540 and a receiver to receive digital data from the power supply 540. In addition to data signals, the digital data may include control signals such as AFE, ADC and DAC control signals and clock synchronization signals.

The power supply 540 is adapted for digital data coupling to the NIC 550. A digital coupler 536 generally defines a bidirectional communication interface between the NIC 550 and the power supply 540. The digital coupler 536 represents a digital communication channel between the NIC 550 and the power supply 540. On the NIC (or PCI card or power line network access circuitry) side, the digital coupler 536 is coupled to the digital interface 542. The digital data from the digital interface 542 is communicated to the power line network access circuitry 538. On the power supply side, the digital coupler 536 is coupled to a circuitry block 528 described below.

With the digital coupler 536, data signals are transmitted or received between the power line network access circuitry side and the power supply side in digital form. The digital coupler 536 may be implemented as a direct parallel connection, serial connection or a combination thereof. For example, data can be sent with a parallel interface while control signals are coupled with a serial interface, depending on the speed of the digital interface and the required control data rate. The digital coupler 536 may be direct, capacitive, resistive, inductive, optical or a combination thereof. The digital data provided through the digital coupler 536 may be modulated over a high-frequency digital data carrier for transmission through the digital coupler 536.

The circuitry block 528 includes the digital interface 534, a DAC 530, an ADC 532 and control circuitry 544. The digital interface 534 couples digital data to and from the digital coupler 536. The digital interface 534 may, for example, be a digital parallel and/or serial interface. The DAC 530 converts digital data from the digital interface 534 to analog form to be transmitted to the power line. The ADC 532 converts analog data signals received from the power line to be provided to the digital interface 534 into digital form. The control circuitry 544, which may be accessed through the digital interface 534, may handle control of the DAC 530, the ADC 532, the digital interface 534 and an AFE 546.

Coupled to the circuitry block 528 is the AFE 546. The AFE 546 amplifies a small-signal analog data carrier from the DAC 530 into a large-signal analog data carrier for transmission to the power line at an adequate power level. The AFE 546 can be an AFE known in the art. Like the circuitry block 528, the AFE 546 is powered by its connection to the positive side of a local power source 500 which may be a dedicated DC power source internal or local to the power supply 540. The local power source 500 may be a subsection of a system power source 590, which specifically provides power to the AFE 546 and the circuitry block 528. The local power source 500 may be isolated or non-isolated with respect to the power supply 540 that provides power to the NIC 550. If the digital coupler 536 provides isolation, the local power source 500 can be non-isolated with respect to the power line. If the digital coupler 536 is isolated, for example, the local power source 500 can be referenced to the power line and may be derived from a winding (primary or secondary) of the system power source 590 to lower overall system cost. It should be understood that the local DC power source 500 may be implemented in a variety of ways.

The power supply 540 connects to a power line through a hot terminal 502 and a neutral terminal 504. The AFE 546 may be coupled through the hot terminal 502 and the neutral terminal 504 either directly (in the non-isolated case) or through an isolation transformer (in the isolated case).

Since the power supply 540 generally is implemented as a switching power supply which is known to generate high-frequency noise at its input terminal, it may useful to couple a filter between the input terminal of the system power source and the power line node where the AFE 546 is coupled to improve signal-to-noise ratio. In accordance with digital data coupling for a power supply, a power-line AFE may be entirely contained in a power supply. No portion of the AFE therefore needs to be provided on the power-line network access circuitry side. By providing the AFE in a power supply, the AFE does not need to be isolated from the power line, provided that the digital coupler is isolated. With respect to power-line networking, another potential advantage of digital data coupling is that the power supply becomes a standalone, self-contained device that handles communication with the power line. In this way, the power supply alone is subject to Federal Communications Commission (FCC) compliance and the PC card manufacturer does not have to obtain FCC compliance for the NIC with respect to power-line networking. Further, with digital data coupling, power-line networking is no longer constrained by the DC voltage levels available on the power-line network access circuitry side. For example, by supporting digital data coupling between a NIC and a power supply, an adequate voltage swing to drive a data carrier onto a power line is achieved without relying upon the low voltage levels used for the NIC.

Figure 1:
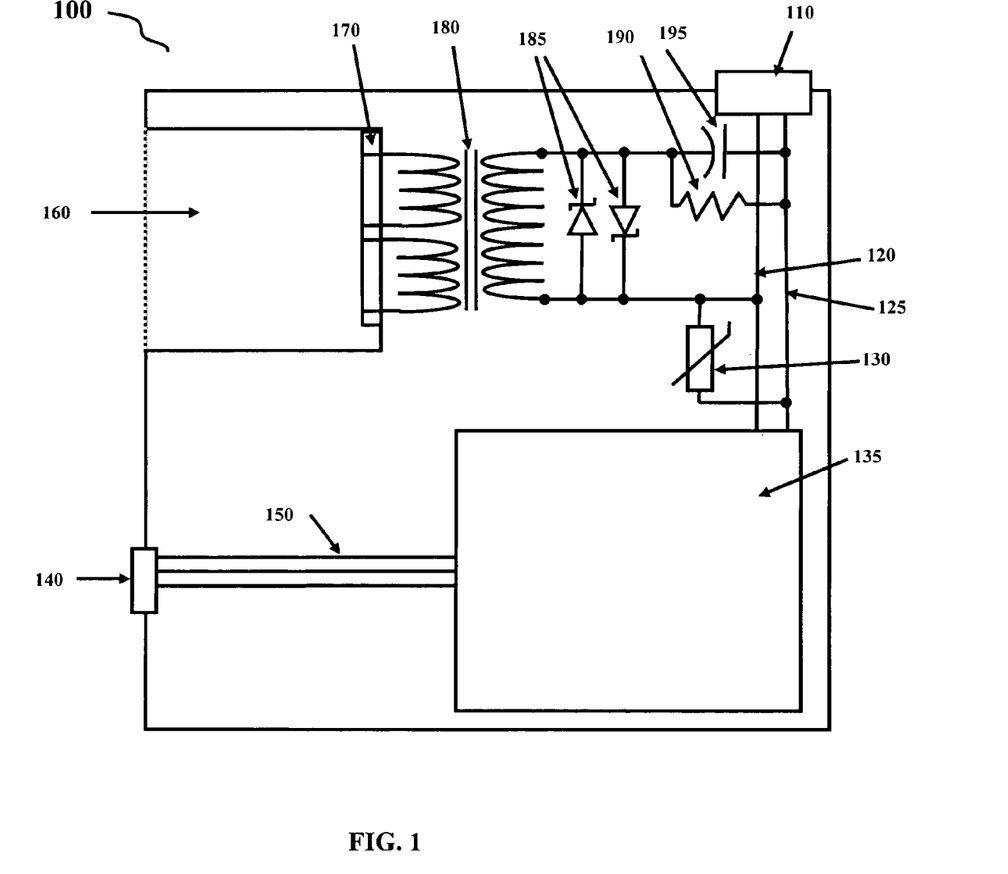
FIG. 1 shows a block diagram of a power supply with modular power line network capability, shown without the network module inserted.

Referring now to FIG. 1, a block diagram of the present invention shown without the networking module is described. The block diagram of the power supply 100 includes an AC input connector 110 that is coupled to a power conversion circuit 135 through paths 120 and 125. Power conversion circuit 135 can be any type known in the art, possibly a switching regulator or chopping regulator, for example. Power conversion circuit 135 typically takes as input an AC voltage from 100VAC to 240VAC and converts it into one or more DC voltages, possibly 3.3VDC, 5VDC, +12VDC and −12VDC, as an example, but may also convert its input to an AC voltage or any combination. Power conversion circuit 135 can be a circuit similar or the same as an existing standard power supply conversion circuit, with or without modifications. Power conversion circuit 135 may connect to an output connector 140 through wires 150, though it is well known in the art for power supplies to not have an output connector 140 and instead, have one or more power cables 150 extending outside of the power supply's case or frame with connectors at each end to connect to various system components, for example mother boards, optical drives and hard disk drives. The diagram is shown in this manner for simplicity purposes being that the connection means is well known in the industry and may not affect this invention.

Included in the power supply of FIG. 1 is a slot 160 for receiving a power line networking module (module is not shown in this figure) and components required by a power line networking standard to couple to the power line as well as isolate the network module from potentially dangerous voltages, spikes and noise. The components shown are those currently recommended for power line networking and are shown only as an example. As power line networking implementations change, perhaps to achieve higher throughput or reliability, these components may change. It is to be noted that, in general, these components are relatively low-cost components and may not add significant costs to the resulting power supply. Therefore, they can be included in every power supply without significant cost impacts on systems that do not include the power line networking option. Furthermore, these components may be located upon the power line networking module in some embodiments. The coupling components consist of a coupling capacitor 195 and coupling resistor 190, diodes 185, transformer 180 and varistor 130. Although component values are not the subject of this invention, typically, these components may be 0.01 uf at 275V for capacitor 195, 400 kilo-ohm, 5%, ⅛ Watt for resistor 190, 6V, low-capacitance TVS DO-204AC (SAC 6.0) for diodes 185, 470V, 1250 Amp MOV (EZRV-07D471) for varistor 130 and transformer 180 is a custom signal coupling transformer. Connector 170 is provided for connection to the optional power line network module (not shown in this diagram).

Figure 2:
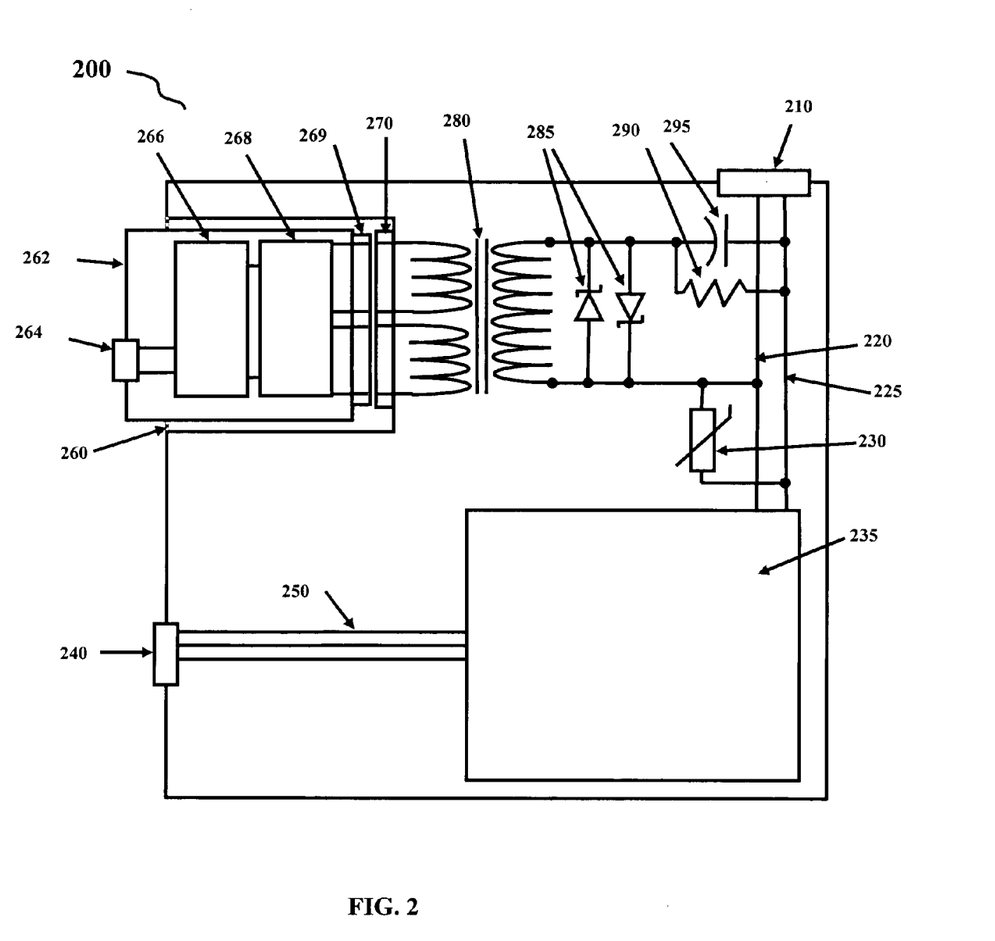
FIG. 2 shows a block diagram of a power supply with modular power line network capability, shown with the network module inserted.

Referring now to FIG. 2, a block diagram of the present invention shown with the networking module inserted is described. The block diagram of the power supply 200 includes an AC input connector 210 that is coupled to a standard power conversion circuit 235 through paths 220 and 225. Power conversion circuit 235 can be any type known in the art, possibly a switching regulator or chopping regulator, for example. Power conversion circuit 235 typically takes as input an AC voltage from 100VAC to 240VAC and converts it to a DC voltage, possibly 3.3VDC, 5VDC, +12VDC and −12VDC, as an example, though it may also output AC voltages or any combination. Power conversion circuit 235 can be a circuit similar or the same as an existing standard power supply conversion circuit, without modification or with minor modifications. Power conversion circuit 235 may connect to an output connector 240 through wires 250, though it is well known in the art for power supplies to not have an output connector 240 and instead, have one or more power cables 250 extending outside of the power supply's case or frame with connectors at each end to connect to various system components, for example mother boards, optical drives and hard disk drives. The diagram is shown as it is for simplicity purposes being that the connection means is well known in the industry and may not affect this invention.

Included in the power supply of FIG. 2 is a slot 260 for receiving a power line networking module 262 and components required by a power line networking standard to couple to the power line as well as isolate the network module from potentially dangerous voltages, spikes and noise. The components shown are those currently recommended for power line networking and are shown only as an example. As power line networking implementations change, perhaps to achieve higher throughput or reliability, these components may change. It is to be noted that, in general, these components are relatively low-cost components and do not add significant costs to the resulting power supply. Therefore, they can be included in every power supply without significant cost impacts on systems that do not include the power line networking option. The coupling components may be relocated to the power line networking module in some embodiments. The coupling components consist of a coupling capacitor 295 and coupling resistor 290, diodes 285, transformer 280 and varistor 230. Although component values are not the subject of this invention, typically, these components may be 0.01 uf at 275V for capacitor 295, 400 kilo-ohm, 5%, ⅛ Watt for resistor 290, 6V, low-capacitance TVS DO-204AC (SAC 6.0) for diodes 285, 470V, 1250 Amp MOV (EZR-V07D471) for varistor 230 and transformer 280 is a custom signal coupling transformer. Connector 270 is provided for connection to the optional power line network module 262.

Connector 269 of power line networking module 262 mates with connector 270 and passes signals between the power line networking module's 262 components and transformer 280. As shown, transformer 280 has two primary windings and one secondary winding. In the current power line networking implementation, each primary winding corresponds to one of a transmit winding and a receive winding. This is shown as an example of a current implementation and is not meant to limit this invention. The power line networking module may be inserted into the power supply to mate with connector 270 or may be attached upon the outside surface of the power supply and connector 270 may be substantially on the surface or in any desired configuration. In this case, it is preferred that connector 270 is female and connector 269 is male so as to reduce any risk of potential shock. Transformer 280 can have any number of primary and secondary windings or can be any device that provides similar signal conversion along with adequate power-line voltage isolation.

Power line networking module 262 may consist of an analog front-end 268 and a digital conversion circuit 266. The analog front-end 268 sends and receives signals to and from the power line through connectors 269 and 270 and through coupling capacitor 295 and coupling resistor 290 and communicates directly with the digital conversion circuit 266. Digital conversion circuit 266 transforms the analog signal to and from a digital signal and transmits/receives digital signals from a host system through connector 264. Digital conversion circuit 266 may contain a processor, digital signal processor or other controller along with necessary components such as crystals and memory, though it is not limited to such. The digital signals used for transmitting and receiving data from the host through connector 264 may be any form of parallel or serial transmission, for example, Universal Serial Bus (USB) may be used. Connectors 269 and 270 may be of various types typically used in the industry. Preferably, connector 269 is the male connector and 270 is the female, but this can be reversed. In one possible embodiment, these connectors are 8 pin header connectors with 0.025" posts at 0.1" centers such as Molex part number 22-03-2081. It should be noted that the host to which the power line networking module communicates may be a computer or any other device with a power supply; for example, a printer.

Figure 3:
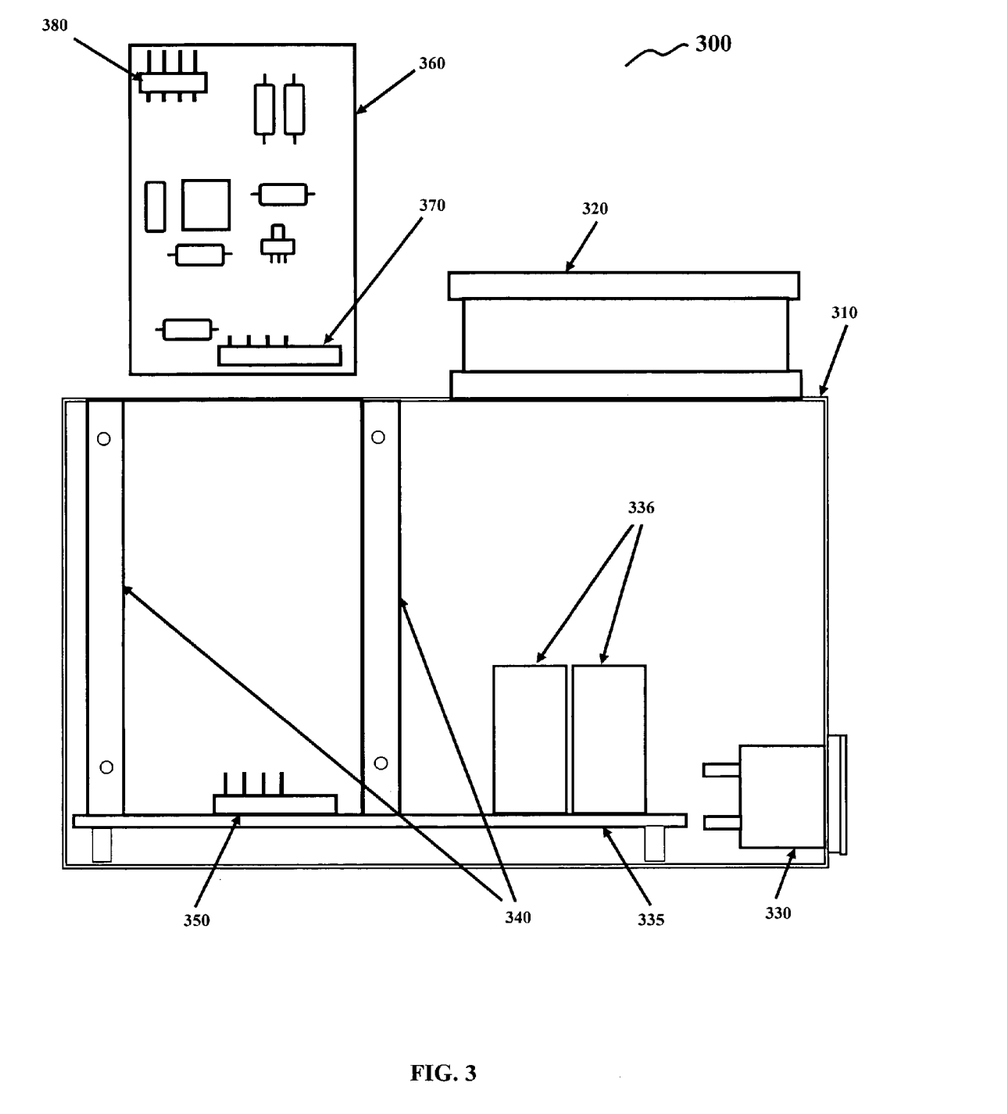
FIG. 3 shows a pictorial diagram of a power supply with modular power line network capability, shown without the network module inserted.

Referring now to FIG. 3, a pictorial diagram of the present invention shown without the networking module inserted is described. The pictorial diagram of the power supply 300 includes an AC input connector 330 that is coupled to a standard power conversion circuit 335 which may be a printed circuit card having a plurality of components mounted on its upper and lower sides. The components for power line networking shown in figures FIG. 1 and FIG. 2 may be mounted on printed circuit card 335. Two of these components are shown as an example 336, though there may be many. Connector 350 is the connector that interfaces the power line networking coupling and isolation components to the power line networking module 360. Power supply 300 may have a fan 320 for cooling purposes. Rails 340 may be provided to guide the insertion of power line networking module 360, but are not necessary for this invention.

Power line networking module 360 is shown aligned and ready for insertion into power supply 300. When inserted, connector 370 will mate with connector 350 and provide signal continuity between power supply 300 and power line networking module 360. Various exemplary components are shown on power line networking module 360, including connector 380, which may be the data connection for transferring data between the system and power line networking module 360. As indicated previously, this data connection may be that of any serial or parallel interface, but a preferred embodiment would be a Universal Serial Bus (USB) interface. In another embodiment of this invention, power line networking module 360 may be mounted externally to power supply enclosure 310 instead of being inserted within. In that case, connector 350 may be on the surface of power supply enclosure 310 and would preferably be a female connector and power line networking module 360 may be fastened to power supply enclosure 310 through various means known in the industry, perhaps with a hinge on one end and a screw on the other.

Figure 4:
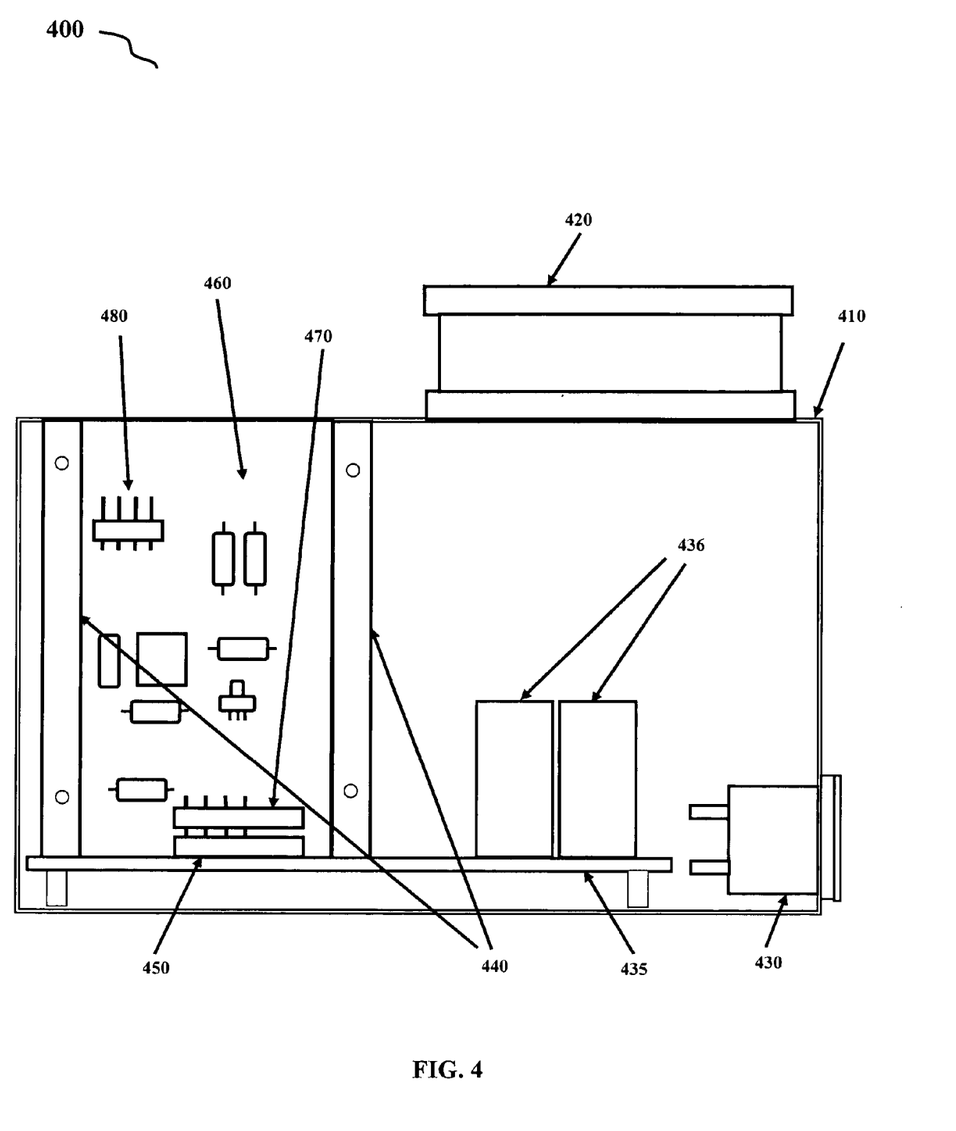
FIG. 4 shows a pictorial diagram of a power supply with modular power line network capability, shown with the network module inserted.

Referring now to FIG. 4, a pictorial diagram of the present invention shown with the networking module inserted is described. The pictorial diagram of the power supply 400 includes an AC input connector 430 that is coupled to a standard power conversion circuit 435 which may be a printed circuit card having a plurality of components mounted on its upper and lower sides. The components for power line networking shown in figures FIG. 1 and FIG. 2 may be mounted on printed circuit card 435. Two of these components are shown as an example 436, though there may be many. Connector 450 is the connector that interfaces the power line networking coupling and isolation components to the power line networking module 460 and is shown mated to connector 470 of power line networking module 460. Power supply 400 may have a fan 420 for cooling purposes. Rails 440 may be provided to guide the insertion of power line networking module 460, but are not necessary for this invention.

Power line networking module 460 is shown inserted into power supply 400. Connector 470 is mated with connector 450 and provides signal continuity between power supply 400 and power line networking module 460. Various exemplary components are shown on power line networking module 460, including connector 480, which may be the data connection for transferring data between the host and power line networking module 460. As indicated previously, this data connection may be that of any serial or parallel interface, but a preferred embodiment would be a Universal Serial Bus (USB) interface. It should be noted that the host to which the power line networking module communicates may be a computer, processing unit or any other device with a power supply; for example, a printer.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A power supply system comprising:
    an enclosure;
    a power line input that passes through said enclosure;
    a power conversion circuit connected to said power line input and housed within said enclosure;
    a power line networking signal coupling circuit connected to said power line input also housed within said enclosure; and
    a first connector connected to said power line networking signal coupling circuit, said first connector adapted to mate with a second connector, said second connector mounted upon a removable power line networking module, said first connector and said second connector adapted to pass at least power line networking signals between said power line networking signal coupling circuit and said removable power line networking module.

2. A power supply system as claimed in claim 1, wherein said power line input is a connector suitable to receive a power cord.

3. A power supply system as claimed in claim 1, wherein said power line networking signal coupling circuit comprises a coupling capacitor and an isolation transformer.

4. A power supply system as claimed in claim 1, wherein said removable power line networking module includes a digital connector to pass networking signals to and from a host system.

5. A power supply system as claimed in claim 4, wherein said digital connector conforms to the IEEE 802.3 Ethernet specification.

6. A power supply system as claimed in claim 4, wherein said digital connector conforms to the Universal Serial Bus (USB) specification.

7. A computer system comprising:
    a chassis;
    at least a processor and a memory;
    a power supply housed within an enclosure;
    a power line input that passes through said enclosure and connects to said power supply;
    a power conversion circuit connected to said power line input and housed within said enclosure;
    a power line networking signal coupling circuit connected to said power line input also housed within said enclosure; and
    a first connector connected to said power line networking signal coupling circuit, said first connector adapted to mate with a second connector, said second connector mounted upon a removable power line networking module, said first connector and said second connector adapted to pass power line networking signals between said power line networking signal coupling circuit and said removable power line networking module.

8. A computer system as claimed in claim 7, wherein said power line input is a connector suitable to receive a power cord.

9. A computer system as claimed in claim 7, wherein said power line networking signal coupling circuit comprises a coupling capacitor and an isolation transformer.

10. A computer system as claimed in claim 7, wherein said removable power line networking module includes a digital connector adapted to pass networking data to and from said processor.

11. A computer system as claimed in claim 10, wherein said digital connector conforms to the IEEE 802.3 Ethernet specification.

12. A computer system as claimed in claim 10, wherein said digital connector conforms to the Universal Serial Bus (USB) specification.

13. A means for providing a power supply system which can accept a power line networking upgrade module comprising:
    a means for housing said power supply system;
    a means for providing power line input that passes through said means for housing;
    a means for converting said power line input to at least one output voltage substantially housed within said housing;
    a means for coupling to power line networking signals, said means for coupling to power line networking signals connected to said means for providing power line input substantially housed within said means for housing; and
    a means for connecting to said means for coupling to power line networking signals.

14. A means for providing a power supply system which can accept a power line networking upgrade module as claimed in claim 13, wherein said means for providing power line input is a connector suitable to receive a power cord.

15. A means for providing a power supply system which can accept a power line networking upgrade module as claimed in claim 13, wherein said means for coupling to power line networking signals comprises a coupling capacitor and an isolation transformer.

16. A means for providing a power supply system which can accept a power line networking upgrade module as claimed in claim 13, further comprising a means for providing a power line network interface module, said power line network interface module removably connected to said means for connecting to said means for coupling to power line networking signals and said power line network interface module having a digital connector.

17. A means for providing a power supply system which can accept a power line networking upgrade module as claimed in claim 16, wherein said digital connector conforms to the IEEE 802.3 Ethernet specification.

18. A means for providing a power supply system which can accept a power line networking upgrade module as claimed in claim 16, wherein said digital connector conforms to the Universal Serial Bus (USB) specification.

19. A power supply system comprising:
    a frame;
    a power line input that passes through said frame;
    a power conversion circuit connected to said power line input and housed within said frame;

a power line networking signal coupling circuit connected to said power line input and housed within said frame; and a first connector connected to said power line networking signal coupling circuit adapted to pass at least power line networking signals.

20. A power supply system as claimed in claim 19, whereas said power line input is a connector adapted to mate with a power cord.

21. A power supply system as claimed in claim 19 wherein said power line networking signal coupling circuit comprises a coupling capacitor and an isolation transformer.

22. A power supply system as claimed in claim 19, further comprising a power line networking module, said power line networking module having a second connector adapted to mate with said first connector to provide a connection to said power line networking signal coupling circuit.

23. A power supply system as claimed in claim 22, wherein said power line networking module has a third connector adapted to connect to a system.

24. A power supply system as claimed in claim 23, wherein said third connector conforms to the IEEE 802.3 Ethernet specification.

25. A power supply system as claimed in claim 23, wherein said third connector conforms to the Universal Serial Bus (USB) specification.

* * * * *